J. H. BACH.
CLAY TEMPERING BLADE.
APPLICATION FILED JULY 3, 1908.
978,536.
Patented Dec. 13, 1910.
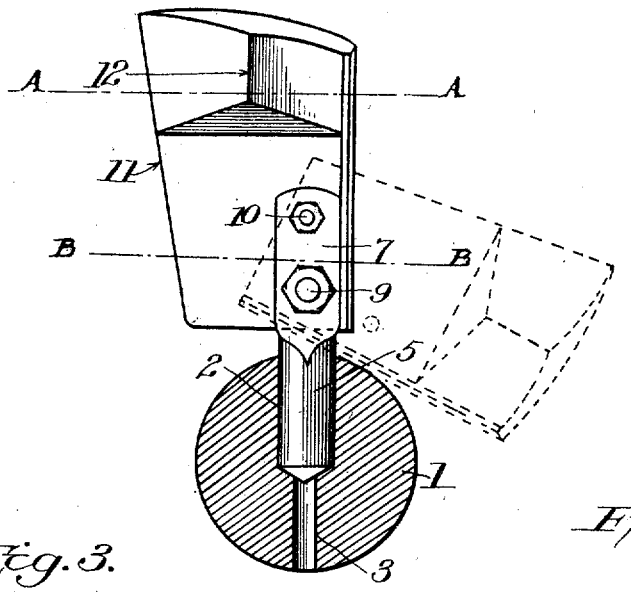
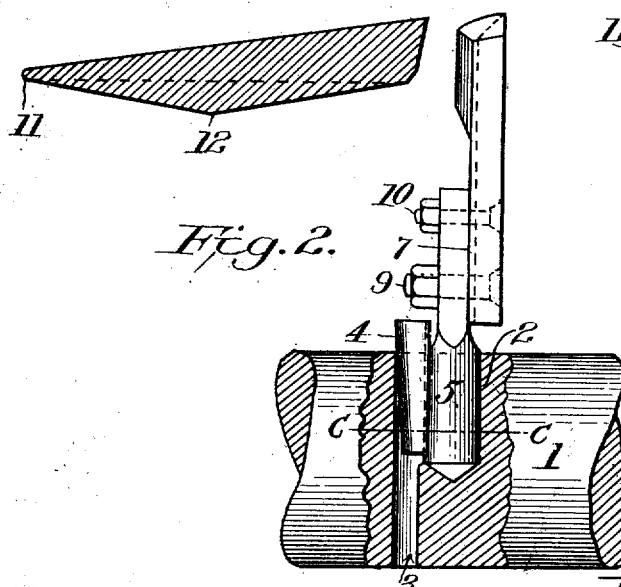
Witnesses
C. N. Walker
A. C. Ernst
Inventor
Julius H. Bach
By P. Walter Fowler
his Attorney

UNITED STATES PATENT OFFICE.

JULIUS H. BACH, OF CHICAGO, ILLINOIS, ASSIGNOR OF TWO-THIRDS TO THE AMERICAN CLAY MACHINERY CO., OF BUCYRUS, OHIO, A CORPORATION.

CLAY-TEMPERING BLADE.

978,536.     Specification of Letters Patent.    Patented Dec. 13, 1910.

Application filed July 3, 1908. Serial No. 441,767.

*To all whom it may concern:*

Be it known that I, JULIUS H. BACH, a citizen of the United States, residing at Chicago, in the county of Cook and State of Illinois, have invented certain new and useful Improvements in Clay-Tempering Blades, of which the following is a specification.

This invention relates to certain new and useful improvements in machines designed particularly for mixing or tempering of clay and which rotary beaters reduce and pulverize clay for the manufacture of brick and other purposes; and the invention consists of the parts and the constructions and combinations of parts which I will hereinafter describe and claim.

In the manufacture of clay products, principally brick, very often there is foreign matter in the clay, usually in the form of stone, which catches between the tempering blades or beaters and the shell of the mill which mixes the water with the clay, and to overcome this difficulty by a simple and effective means and to avoid delays and expensive break-downs, is the essential object of the present invention, said invention comprehending a two-part blade or knife which is designed to collapse under a predetermined strain whereby upon meeting an incompressible object, as a stone, the working member of the blade or knife will be permitted to swing rearwardly into an inoperative position, but will remain attached to its shaft or carrier instead of breaking off and dropping into the shell of the mill where it is liable to be passed into the brick machine along with the clay, to the possible injury of the knives or blades of this latter machine.

In the accompanying drawings forming part of this specification and in which similar reference numerals indicate like parts in the several views, Figure 1, is a side elevation of a knife and its shank, and cross section of the shaft, the full lines showing the knife in its operating position, and the dotted lines showing the knife collapsed. Fig. 2, is the side elevation of a portion of the shaft with a part broken away and an edge view of the knife and its shank, Fig. 3, is a cross sectional view of the outer end of the knife, on the line A—A in Fig. 1, Fig. 4, is a cross sectional view on the line B—B of Fig. 1, Fig. 5, is a sectional view on the line C—C of Fig. 2.

In the aforesaid drawings I have illustrated only so much of a pug mill or like machine as will illustrate the salient features of my invention, it being understood that this mill may be of any appropriate character and that it will include a shell or casing not shown, and the usual tempering shaft, 1, which shaft will, in practice, be bored with a series of holes, 2, which in practice will be bored on a spiral line in order to set the tempering knives or blades at different positions around the shaft. As this arrangement of knives is well known, I do not illustrate the same but confine the illustration to a single knife or blade and the means by which it is removably and adjustably secured to said shaft. The holes, 2, extend only partway through the shaft, say to a point slightly beyond the center thereof, and said shaft is also bored with a hole 3, which extends clear through the shaft and has one portion intersecting the hole, 2, and adapted to receive a suitable key, 4, by which the shank of the tempering knife or blade, hereinafter described, may be engaged and suitably held in position. The holes, 2, are preferably of circular form, although they may be otherwise made, and the tempering knife or blade has one of its parts provided with a shank, 5, which in shape and size is adapted to fit the opening, 2, formed in said shaft, and to be engaged by the aforesaid key. That portion of the shank which projects beyond the perimeter of the shaft is flattened to form a seat, 7, on which the corresponding flattened inner end of the tempering blade or knife rests and is held in position thereto by suitable bolts 9 and 10, which have their heads countersunk below the outer side of said blade or knife, said bolts being securely held by suitable nuts, as shown.

By reference to Figs. 1 and 2 it will be seen that the securing bolts, 9 and 10 are of different diameters or sizes and are located at different distances from and exterior to the perimeter of the shaft, the outermost bolt being much smaller than the innermost bolt, 9, whereby the bolt, 10, is of less strength than the bolt, 9, and is adapted to yield or be ruptured under a predetermined strain. In other words, if the working member or the upper portion of the two-part tempering blade or knife should, during the operation of the same, meet an incompressible object, as a stone and this stone should catch between the surface or point 11, of the knife and the cylinder of the machine, the resistance offered by said stone or incompressible object will be transmitted to the smaller and weaker bolt, 10, and will cause this bolt to shear off and thus permit the knife to turn about the other bolt, 9, as an axis and fold backward from the direction of rotation of the shaft, 1, and upon said shaft, thereby preventing the tempering blade or knife from breaking off and becoming detached from the part which carries it and catching other knives, or passing from the tempering or pug-mill into the brick-machine, where it is liable to catch the knives of said machine and break them, or do other damage.

As the outer end of the working member of the tempering knife or blade wears more rapidly than the body of the same, I thicken or reinforce said end as shown at 12, to compensate for the increased wear and thus prolong the life of the knife and thereby lower or reduce the expense of renewing the tempering blades.

In its operative condition, the tempering blade or knife occupies the position shown by the full lines in Fig. 1 and the shaft, 1, operates in the direction of the arrow. Upon the knife or blade meeting a stone or incompressible object sufficient to shear the bolt, 10, the blade immediately swings from the full line position of Fig. 1 into the dotted position in said Fig. 1. The blade may be restored to its normal working position by shutting down the pug-mill and swinging the working member of the blade about the bolt, 9, into the full line position of Fig. 1 and then inserting a new bolt, 10, when the machine may be again started in operation.

It is well recognized in this art that as the tempering blades wear in length the capacity of the machine decreases, and in order to overcome this depreciation the key, 4, is drifted out through the hole and the knife is axially turned about its shank, 2, and set at a greater angle, when the key is again driven back in position, to increase the capacity of the knife as it revolves through the clay.

An important advantage flowing from the employment of the foregoing construction is a saving in time and labor as it is not necessary to close down or stop the machine to drive out the shank of the blade or knife and insert a new one, but to simply turn a disabled blade into its proper position and insert a new bolt, 10. Considerable advantage also results from the specific shape given the working portion of the blade or knife. It will be observed that the blade has a greater radius on its front edge than on the rear edge, the outer end of said blade curving or declining from the front corner toward the rear corner whereby the radius is reduced quite a little. By reason of this construction the effect on the material which may be in the hopper of the granulator is for the point of the blade or knife to raise the material and the back of the blade being shorter will allow the material to fall in back of the blade and consequently the succeeding blade will engage and disintegrate the material and force the same forward.

By the use of the ordinary blades having the same radius from the shaft, and where the blade has its greatest radius at the center, the blade has a tendency to hold the material up for too long a time and consequently the following blade will be in a vertical position or very nearly so, before the material has an opportunity of dropping down in the granulator and give the following knives a chance to properly act on the material.

Having thus described my invention what I claim as new and desire to secure by Letters Patent is:

1. A tempering blade consisting of a shank-portion and a knife-portion, said knife-portion being wider than said shank and having a two-bolt connection therewith along substantially the rear edge of the knife-portion, the contacting faces of said knife-portion and shank being unobstructed and adapted when a bolt is broken to move freely one on the other about the remaining bolt.

2. The combination with a shaft having an opening, of a tempering blade having a shank portion to fit said opening and having the outer main portion widened, said outer portion being substantially wedge-shaped in cross section with the thickest portion at the rear, and having its outer extremity thickened to form a reinforce therefor, the thickest portion of the reinforce being at the center of said extremity and tapering from the center toward the back and front edges.

In testimony whereof I affix my signature in presence of two witnesses.

JULIUS H. BACH.

Witnesses:
A. O. PERROTT,
W. M. HUBBELL.